OR 3,790,247

United States
Korsch

[11] 3,790,247
[45] Feb. 5, 1974

[54] ALL REFLECTIVE IMAGE SPACE SCANNING DEVICE

[75] Inventor: Dietrich Korsch, Ann Arbor, Mich.

[73] Assignee: The Bendix Corporation, Southfield, Mich.

[22] Filed: June 9, 1972

[21] Appl. No.: 261,461

[52] U.S. Cl. .................. 350/7, 350/285, 350/294
[51] Int. Cl. ............................................. G02b 17/00
[58] Field of Search... 350/6, 7, 199, 285, 288, 293, 350/294

[56] References Cited
UNITED STATES PATENTS

| 3,554,628 | 1/1971 | Kennedy | 350/7 |
| 3,667,850 | 6/1972 | Smith | 350/7 |
| 3,244,885 | 4/1966 | McHenry | 350/7 |
| 3,544,165 | 12/1970 | Snedden | 350/6 |
| 3,508,068 | 4/1970 | Harris | 350/6 |
| 3,469,030 | 9/1969 | Priebe | 350/6 |
| 3,602,571 | 8/1971 | Norris | 350/7 |

Primary Examiner—John K. Corbin
Assistant Examiner—Michael J. Tokar
Attorney, Agent, or Firm—John S. Bell

[57] ABSTRACT

The illustrated scanning device includes a rotatable wheel having six scanning mirrors mounted thereon disposed between a spherical primary mirror and the image provided by the primary mirror. The portion of the wheel nearest the image approximates a hyperbola having a front focal point offset from the center of the wheel. As the wheel rotates and sequentially moves the scanning mirrors along the hyperbola, each mirror reflects image information along a line across the image to the front focal point of the hyperbola. A small mirror is disposed at the focal point to reflect light toward a remote detector.

5 Claims, 2 Drawing Figures

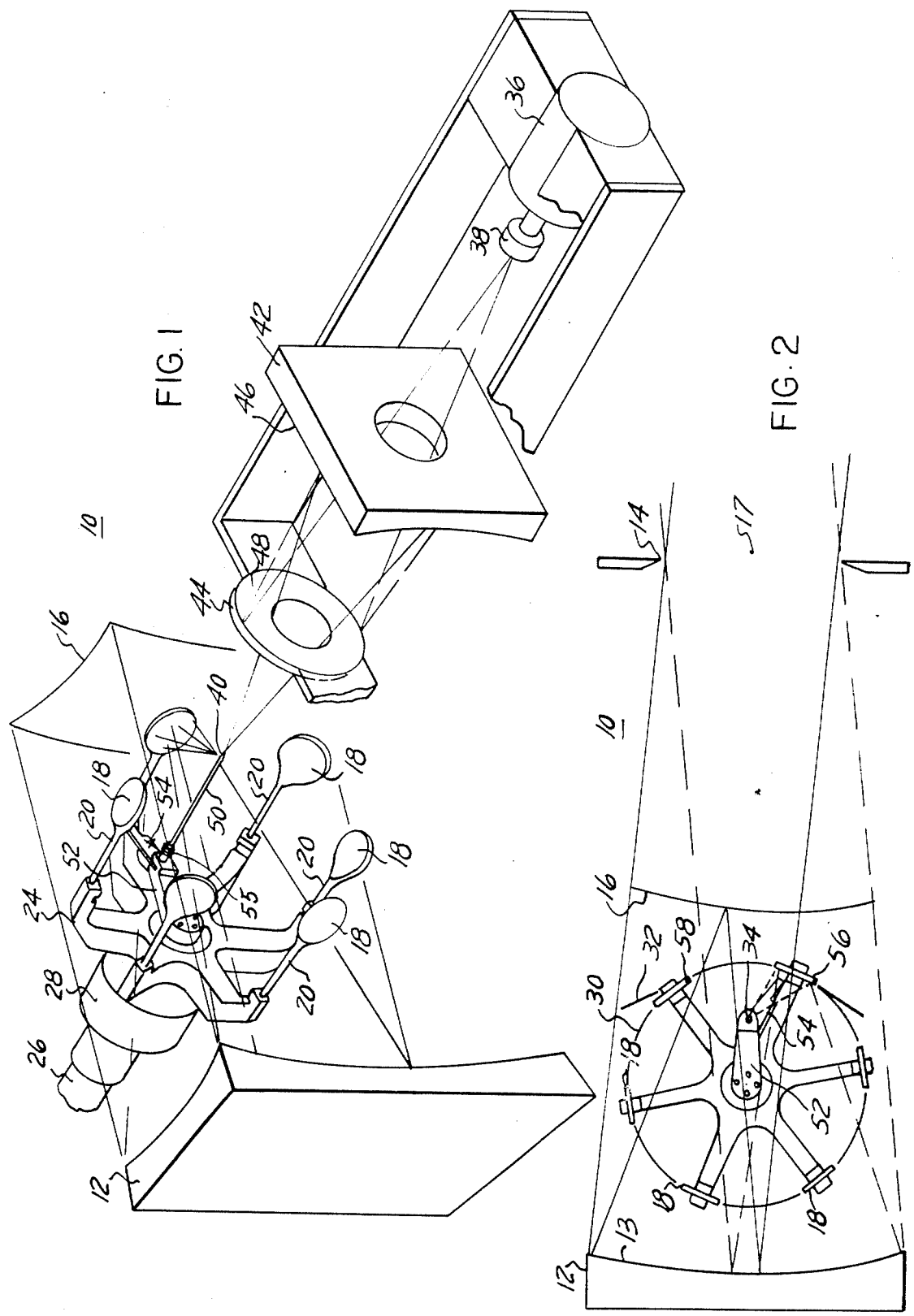

ALL REFLECTIVE IMAGE SPACE SCANNING DEVICE

BACKGROUND OF THE INVENTION

1. Field of the Invention

Line scanning devices.

2. Brief Description of the Prior Art

The term "image space scanner" is a term of art that refers to a scanner in which a small scanning element receives light from a larger primary focusing element such as a primary mirror. The term distinguishes "object space scanners" in which a large mirror in front of the primary element faces a scene of interest and scans across it. Image space scanners are generally smaller and lighter than object space scanners because the heavy and powerful scanning apparatus required in an object space scanner to scan the large mirror is not required in an image space scanner. An image space scanner is thus particularly useful in an aircraft or satellite environment in which it is important to minimize size and weight.

One known image space scanner includes a spherical primary mirror for receiving light from a scene and forming an image of that scene. A lens is mounted on a rotating ring whose center is at the center of curvature of the spherical primary mirror. The ring is rotated to scan the lens across the image. As the lens is scanned, it sequentially projects the image points forming a line across the image to the center of curvature of the primary spherical mirror where a detector can be placed. In order to obtain a high duty cycle, a set of lenses can be mounted equally spaced on the ring.

One drawback of this image plane scanner is that any lightweight embodiment must be large. The diameter that a lens is required to have in order to receive all light from one point on an image is proportional to the distance between that lens and the image. In order to construct an embodiment in which the scanning lenses are small enough so that the weight of the lenses and apparatus for supporting the lenses will not be prohibitively heavy, the ring on which the lenses are mounted must have a diameter close to the focal length of the primary mirror so that the lenses are scanned close to the image. The large diameter of the scanning ring causes the scanner to be very bulky. Another drawback of this scanner is that one embodiment cannot be used for a wide range of wavelengths because of chromatic aberration and the limited transmission of any refractive material, and cannot for example be used for both infrared and ultraviolet imaging.

SUMMARY OF THE INVENTION

The image space scanning device of this invention includes compact scanning apparatus that minimizes the size of the scanning device. This scanning apparatus comprises a mechanism for rotating a small secondary mirror along a small circular scan path disposed between a spherical primary and its image surface. In the embodiment illustrated herein, the primary comprises a mirror so that the scanning device will be free of any refractive element and can therefore be used over a wide frequency range. One portion of the scanning circle at least substantially coincides with a hyperbola having a front focal point disposed between that portion of the scanning circle and the primary mirror. The scanning mirror faces the primary mirror as it moves along the hyperbola and sequentially reflects light forming consecutive points along a line across the image to the front focal point of the hyperbola. A small mirror is disposed at the front focal point of the hyperbola to receive and reflect light from the scanning mirror through secondary optics toward a remote detector input to a mapping or other utilization apparatus.

The image space scanning device of this invention is lightweight. Each scanning mirror need only be sufficiently large to intercept the radiation forming one resolution element of the image at any one instant. In the embodiment illustrated herein, each scanning mirror is only about one fiftieth the size of the primary mirror. The small size and weight of the scanning mirror, and the short scan path permit the scanning apparatus, and hence the entire scanning device, to be lightweight.

A high duty cycle is obtained in the embodiment illustrated herein by using a plurality of scanning mirrors and an oscillating folding mirror at the focal point which faces only the mirror traversing the hyperbola and reflecting light to the front focal point.

BRIEF DESCRIPTION OF THE DRAWINGS

Further objects, features, and advantages of this invention, which is defined by the appended claims, will become apparent from the consideration of the following description and the accompanying drawings in which:

FIG. 1 is a schematic, perspective view of one embodiment of the image space line scanning device of this invention; and FIG. 2 is a cutaway, side view of a portion of the line scanning device of FIG. 1 that illustrates the relative positions of the primary and scanning mirrors with respect to the image formed by the primary mirror.

DETAILED DESCRIPTION OF THE PREFERRED EMBODIMENT

FIGS. 1 and 2 illustrate an image space line scanning device 10 having a primary mirror 12 with a spherical reflecting surface 13 adapted to receive light from a scene through an entrance aperture 14 and provide a spherical image 16 of that scene. Entrance aperture 14 is located at the center of curvature 17 of mirror 12, or in other words at the center of the sphere defined by the projection of surface 13, in order to maximize the field of view of the primary mirror. Image 16 is referred to herein as a spherical image because the image defines a portion of a spherical surface concentric with spherical surface 13 and disposed half way between surface 13 and a center of curvature 17. For example, an image of a straight line at infinity comprises an arc of such a sphere.

Scanning device 10 also includes six small secondary or scanning mirrors 18 connected by rods 20 to a wheel 24 rotatably mounted on a fixed shaft 26. A motor 28 drives wheel 24. As is best illustrated in FIG. 2, the rotation of wheel 24 scans mirrors 18 along a circle 30. One portion of this circle at least substantially coincides with a hyperbola 32 having a back focal point at the center of curvature 17 of mirror 12 and a front focal point at position 34. Light is reflected from a scan mirror 18 traveling along hyperbola 32 to position 34. However, scanning device 10 includes a mapper 36 having a fixed detector 38 remote from point 34. A small mirror 40, and two annular mirrors 42 and 44 having concave and flat surfaces 46 and 48, respectively, are therefore positioned to reimage the resolution element at position 34 to detector 38. Mirror surface 48 is shaped to correct for any spherical aberration caused by the shape of mirror surface 13. Mirror 40 is mounted at position 34 on a rotatable rod 50. Rod 50 is mounted on a stationary arm 52 which is fixedly attached to shaft 26 so that mirror 40 will not be displaced from point 34 as it rotates. A spring loaded rod 54 having a length such that it will be intercepted by a rod 20 of a scanning mirror 18 traveling along hyperbola 32 is connected to rod 50 and urged by spring 55 to rotate mirror 40.

Scan circle 30 may have different diameters in different embodiments in which different resolutions are required. The resolution of scanning device 10 and the length of the scan lines across image 16 are increased by moving front focal position 34 toward mirror 12 while holding the back focal point of the hyperbola fixed at point 17. A circle 30 that substantially coincides with a selected portion of a particular hyperbola 32 is found by superimposing various circles on the hyperbola. As position 34 is moved toward mirror 12 to increase resolution, the hyperbola is flattened and the size of the circle 30 required to match the resulting hyperbola 32 is increased. In designing any particular embodiment of scanning device 10, front focal point 34 is moved as close to image 16 as possible, and the diameter of spider 20 is made as small as possible consistent with the required resolution. If a limit of achievable resolution is reached by altering the scan circle, resolution can also be varied by varying the focal ratio (focal length divided by diameter) of the primary 12. The larger the focal ratio the higher the achievable resolution.

In operation, in order to provide a complete scan of a scene, device 10 is moved along one direction across that scene. During this movement, the device is oriented so that scanning mirrors 18 scan lines across image 16 that are perpendicular to the direction of motion of the device 10. As each scanning mirror 18 travels along hyperbola 32, it reflects the information contained in the image of one scan line in image surface 16 to point 34. Motor 28 rotates wheel 24 at a sufficiently fast rate so that successive scan lines are sufficiently close together in the scene to provide a complete representation of the scene. In different embodiments, wheel 24 may rotate either clockwise or counter-clockwise. Assuming counter-clockwise rotation, the length of rod 54 is such that each rod 20 intercepts rod 54 at point 56 at which scan path 30 intercepts hyperbola 32. Rod 54 rotates mirror 40 to face and receive light from the scanning mirror 18 traveling along hyperbola 32. The length of rod 54 causes it to be released from a rod 20 at point 58 at which scan circle 30 departs from hyperbola 32. Because rod 54 is spring loaded, it returns to position 56 to be intercepted by the next rod 20. Mirror 40 reflects received light via mirrors 42 and 44 to detector 38. This detector converts light to electric signals that mapper 36 uses to provide a representation of the scene over which the device 10 is passing.

Having thus described one embodiment of this invention, a number of modifications will occur to those skilled in the art. Therefore, what is claimed is:

1. An image space line scanning device for feeding image information to utilization apparatus having fixed detecting means for receiving image information at one predetermined location comprising:

imaging means for receiving and focusing wave energy to provide a spherical image;
a scanning mirror for receiving said wave energy from said imaging means;
scanning means for scanning said mirror along a circular scan path having one portion that substantially defines a hyperbola having a front focal point located between said imaging means and said one portion of said scan path, said scanning mirror being mounted on said scanning means to face said imaging means while scanning along said hyperbola and sequentially project the wave energy forming subsequent points along a line across said image to said front focal point of said hyperbola; and
a wave energy receiving element disposed at said front focal point to receive wave energy from said scanning mirror.

2. The scanning device of claim 1 in which:
said imaging means comprises a spherical primary mirror having a center of curvature and a concave reflecting surface;
said one portion of said scan path defines a hyperbola having a back focal point located at the center of curvature of said primary mirror; and
said scan path is entirely located between said primary mirror and the image formed by said primary mirror.

3. The scanning device of claim 2 wherein said scanning mirror has a surface area less than one-fiftieth of the surface area of said primary mirror, the small size of said scanning mirror causing said mirror to be sufficiently light to be scanned by a lightweight scanning apparatus, and thereby minimizing the weight of the scanning device.

4. The scanning device of claim 2 in which:
the utilization apparatus detecting means is spaced from said front focal point;
said scanning means includes:
a rotatable wheel disposed substantially perpendicular to said reflecting surface of said primary mirror; and
a first rod connecting said scanning mirror to said wheel;
said wave energy receiving element disposed at said front focal point comprises a second mirror substantially smaller than said scanning mirror for reflecting wave energy to said detecting means;
said front focal point is located closer to said hyperbola than to the portions of said circular scan path displaced from said hyperbola and equal distances from the two opposite ends of said hyperbola with said circular scan path; and
the scanning device further includes a rotatable mounting for said second mirror, said mounting including a spring loaded second arm having a length substantially equal to the distances between said front focal point and the opposite ends of said hyperbola intercepting said circular scan path so that said first rod is caused to intercept said second rod substantially at the position at which said circular scan path intercepts said hyperbola and to release said second rod substantially at the position at which said circular scan path departs from said hyperbola, said first and second rods thereby rotating said second mirror to face said scanning mirror as said scanning mirror traverses said hyperbola and causing said second mirror to receive all image information along said line across said image.

5. The scanning device of claim 4 further including a plurality of additional scanning mirrors connected to said wheel, each of said scanning mirrors being positioned to traverse said hyperbola and reflect radiation to said front focal point at a time when the others of said scanning mirrors are not facing said rotating second mirror at the focal point, said additional scanning mirrors thereby increasing the portion of the operating time of the line scanning device during which image information is transmitted to said detecting means.

* * * * *